(12) United States Patent
Ko et al.

(10) Patent No.: US 11,011,807 B2
(45) Date of Patent: May 18, 2021

(54) BATTERY AND FRAME FOR MECHANICALLY COUPLING ELECTRODE TAB TO ELECTRODE LEAD IN BATTERY

(71) Applicant: LG Chem, Ltd., Seoul (KR)

(72) Inventors: Seung-Hee Ko, Daejeon (KR); Jae-Bin Chung, Daejeon (KR)

(73) Assignee: LG Chem, Ltd.

( * ) Notice: Subject to any disclaimer, the term of this patent is extended or adjusted under 35 U.S.C. 154(b) by 366 days.

(21) Appl. No.: 15/887,480

(22) Filed: Feb. 2, 2018

(65) Prior Publication Data

US 2018/0219207 A1 Aug. 2, 2018

(30) Foreign Application Priority Data

Feb. 2, 2017 (KR) .................. 10-2017-0015071

(51) Int. Cl.

| | |
|---|---|
| H01M 2/26 | (2006.01) |
| H01M 10/04 | (2006.01) |
| H01M 10/0525 | (2010.01) |
| H01M 10/0585 | (2010.01) |
| H01M 2/10 | (2006.01) |
| H01M 2/30 | (2006.01) |
| H01M 50/54 | (2021.01) |
| H01M 50/20 | (2021.01) |
| H01M 50/528 | (2021.01) |
| H01M 50/531 | (2021.01) |

(Continued)

(52) U.S. Cl.
CPC ......... *H01M 50/54* (2021.01); *H01M 10/049* (2013.01); *H01M 50/20* (2021.01); *H01M 50/528* (2021.01); *H01M 50/531* (2021.01); *H01M 50/543* (2021.01); *H01M 50/557* (2021.01); *H01M 10/0525* (2013.01); *H01M 10/0585* (2013.01); *H01M 2220/20* (2013.01); *H01M 2220/30* (2013.01)

(58) Field of Classification Search
CPC .......... H01M 10/049; H01M 10/0525; H01M 10/0585; H01M 2220/20; H01M 2220/30; H01M 2/021; H01M 2/0212; H01M 2/10; H01M 2/22; H01M 2/26; H01M 2/266; H01M 2/30
See application file for complete search history.

(56) References Cited

U.S. PATENT DOCUMENTS

| | | | |
|---|---|---|---|
| 2011/0129717 A1 | 6/2011 | Moon | |
| 2013/0243665 A1* | 9/2013 | Hur .................. | B01L 3/502 422/512 |

(Continued)

FOREIGN PATENT DOCUMENTS

| | | | |
|---|---|---|---|
| JP | 2013239266 A | * | 11/2013 |
| KR | 10-2012-0010154 A | | 2/2012 |
| KR | 10-2016-0084066 A | | 7/2016 |

*Primary Examiner* — Zhongqing Wei
(74) *Attorney, Agent, or Firm* — Lerner, David, Littenberg, Krumholz & Mentlik, LLP (57) ABSTRACT

A coupling frame includes a support body configured to contact at least one of the electrode tab and the electrode lead; a first perforating portion bent from one end of the support body; and a second perforating portion bent from the other end of the support body. The first and second perforating portions are inserted into the electrode tab and the electrode lead to pass through first and second points of a contact surface between the electrode tab and the electrode lead.

12 Claims, 9 Drawing Sheets

(51) Int. Cl.
  *H01M 50/543* (2021.01)
  *H01M 50/557* (2021.01)

(56) References Cited

U.S. PATENT DOCUMENTS

2015/0004440 A1\* 1/2015 Hwang ............... H01M 2/0212
                                                    429/7
2015/0214530 A1   7/2015 Lee
2016/0317350 A1\* 11/2016 Kadonosono ......... A61M 5/158

\* cited by examiner

BATTERY AND FRAME FOR MECHANICALLY COUPLING ELECTRODE TAB TO ELECTRODE LEAD IN BATTERY

CROSS-REFERENCE TO RELATED APPLICATIONS

The present application claims priority to Korean Patent Application No. 10-2017-0015071 filed on Feb. 2, 2017, which is incorporated herein by reference.

TECHNICAL FIELD

The present disclosure relates to a frame and a battery including the frame, and more particularly, to a frame having a structure capable of mechanically coupling an electrode tab and an electrode lead of a rechargeable battery, and a rechargeable battery including the frame.

BACKGROUND ART

Demand for portable electronic products such as notebook computers, video cameras, portable telephones and the like has been drastically increased and electric vehicles, storage batteries for energy storage, robots, satellites and the like have been actively developed. As a result, high performance secondary batteries capable of repeated charge and discharge have been actively studied.

Lithium secondary batteries currently commercially available include nickel-cadmium batteries, nickel-hydrogen batteries, nickel-zinc batteries and lithium secondary batteries. Among them, the lithium secondary batteries are in the spotlight because they have almost no memory effect compared to nickel-based secondary batteries, and thus can perform charge and discharge freely, have very low self-discharge rate, and have high energy density.

Figure 1:
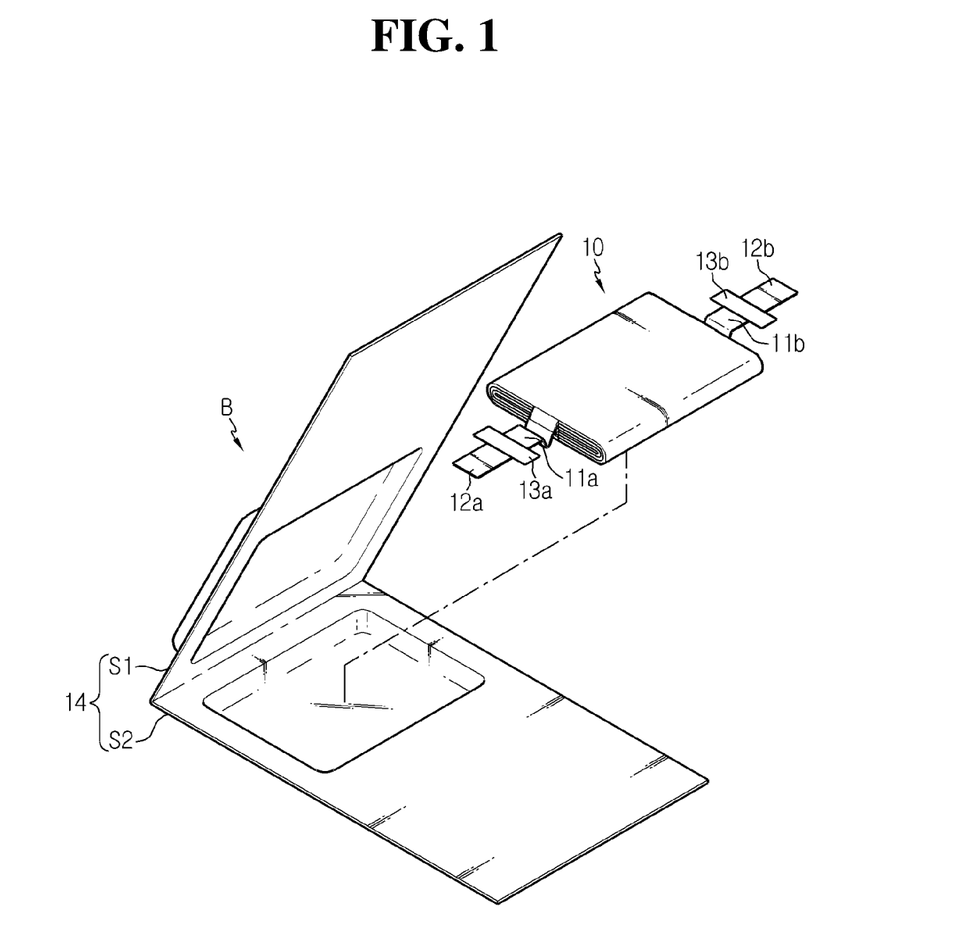
FIG. 1 is a diagram schematically showing a conventional battery.

Referring to FIG. 1, a battery B is formed by mechanically coupling an electrode tab 11a, 11b protruding from a body of an electrode assembly 10 to an electrode lead 12a, 12b, and then enclosing the electrode lead 12 by an exterior of a pouch case 14 so that a part of the electrode lead 12 is exposed, as disclosed in Korean Patent Application Publication No. 10-2016-0084066.

Conventionally, welding is performed for mechanical coupling between the electrode tab and the electrode lead. Specifically, in a state where any one of the electrode tab and the electrode lead is partially overlapped with the other, the overlapped portion is thermally fused by ultrasonic welding, laser welding, or the like. Bonding strength between the electrode tab and the electrode lead is improved in comparison to the case where an adhesive is simply applied.

However, the mechanical coupling between the electrode tab and the electrode lead by welding causes some problems. In more detail, referring to FIGS. 1 and 2, if the surface of the welded portion is not smooth, the uneven surface could damage a multi-layered structure L1, L2, L3 of the pouch cases S1, S2. Thus, if an inner insulation side L3 is broken to expose a metal layer L2, fire or the like may occur due to an electrical short circuit.

An insulating tape 13a, 13b may be used to cover each welded portion (also, an end portion of the electrode tab, which is not welded) to alleviate the above problem. However, since the insulating tape 13a, 13b also has a limit in thickness, the damage of the pouch case 14 due to the welded portion cannot be completely prevented.

SUMMARY

The present disclosure is designed to solve the above-described problems, and therefore the present disclosure is directed to providing a coupling frame having a structure capable of providing excellent mechanical coupling between an electrode tab and an electrode lead of a battery, and a battery including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided a coupling frame for coupling an electrode tab and an electrode lead of a battery, the coupling frame comprising: a support body extending with a predetermined length and configured to contact at least one of the electrode tab and the electrode lead; a first perforating portion bent from one end of the support body to have a first angle with the support body and having a needle-type tip; and a second perforating portion bent from the other end of the support body to have a second angle with the support body and having a needle-type tip. The first perforating portion is inserted into the electrode tab and the electrode lead to pass through a first point of a contact surface between the electrode tab and the electrode lead. The second perforating portion is inserted into the electrode tab and the electrode lead to pass through a second point of the contact surface between the electrode tab and the electrode lead.

In addition, the coupling frame may further comprise a cover unit having an insulating material and formed to cover the support body at least partially.

In addition, the first angle and the second angle may be right angles, and the first perforating portion and the second perforating portion may be parallel to each other.

In addition, at least one of the first perforating portion and the second perforating portion may include a pipe part connected to the support body and having an inner space, so that at least one hole connected to the inner space is formed therein; and a filler accommodated in the inner space and having fluidity when a predetermined condition is satisfied.

In addition, the pipe part may include a material with thermal conductivity and electric conductivity, and the filler may include a thermosetting material.

In another aspect of the present disclosure, there is also provided a battery, comprising: an electrode assembly; an electrode tab extending from one side of the electrode assembly; an electrode lead connected to the electrode tab; and a first coupling frame configured to coupling the electrode tab and the electrode lead to each other. The first coupling frame includes a first support body extending with a predetermined length and configured to contact at least one of the electrode tab and the electrode lead; a first perforating portion bent from one end of the first support body to have a first angle with the first support body and having a needle-type tip; and a second perforating portion bent from the other end of the first support body to have a second angle with the first support body and having a needle-type tip. The first perforating portion is inserted from the electrode tab toward the electrode lead to pass through a first point of a contact surface between the electrode tab and the electrode lead. The second perforating portion is inserted from the electrode tab toward the electrode lead to pass through a second point of the contact surface between the electrode tab and the electrode lead.

In addition, the battery may further comprise a second coupling frame. The second coupling frame may include a second support body extending with a predetermined length and configured to contact at least one of the electrode tab and the electrode lead; a third perforating portion bent from one end of the second support body to have a first angle with the second support body and having a needle-type tip; and a fourth perforating portion bent from the other end of the second support body to have a second angle with the second support body and having a needle-type tip. The third perforating portion may be inserted from the electrode lead toward the electrode tab to pass through a third point of the contact surface between the electrode tab and the electrode lead. The fourth perforating portion may be inserted from the electrode lead toward the electrode tab to pass through a fourth point of the contact surface between the electrode tab and the electrode lead.

In addition, the first perforating portion and the third perforating portion may come into contact with each other at least partially in a state of being inserted into the electrode tab and the electrode lead, respectively.

In addition, the first perforating portion may include a first pipe part connected to the first support body and having a first inner space, so that a first hole connected to the first inner space is formed therein; and a filler accommodated in the first inner space and having fluidity when a predetermined condition is satisfied.

In addition, the third perforating portion may include a third pipe part connected to the second support body and having a second inner space, so that a second hole connected to the second inner space is formed therein. The first hole and the second hole may face each other at least partially in a state where the first coupling frame and the second coupling frame are inserted into the electrode tab and the electrode lead, respectively.

In addition, the filler may be leaked from the first hole due to heat transferred from the first pipe part and introduced into the second inner space through the second hole.

According to an embodiment of the present disclosure, it is possible to increase the mechanical coupling between the electrode tab and the electrode lead of a battery and prevent a damage to the exterior due to the electrode tab or electrode lead, instead of a conventional welding method.

The advantages in accordance with embodiments of the present disclosure are not limited to those mentioned above, and other advantages not mentioned herein may be clearly understood from the appended claims by those skilled in the art.

BRIEF DESCRIPTION OF DRAWINGS

The accompanying drawings illustrate embodiments of the present disclosure and together with the foregoing disclosure, serve to provide further understanding of the technical features of the present disclosure, and thus, the present disclosure is not construed as being limited to the drawing.

DETAILED DESCRIPTION

Hereinafter, embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in the present disclosure, if it is judged that detailed explanation on a known technique or configuration may unnecessarily make the essence of the present disclosure vague, the detailed explanation will be omitted.

Throughout the specification, when a portion is referred to as "comprising" or "including" any element, it means that the portion may include other elements further, not excluding other elements unless specifically stated otherwise. Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, a coupling frame and a battery according to an embodiment of the present disclosure will be described.

Figure 2:
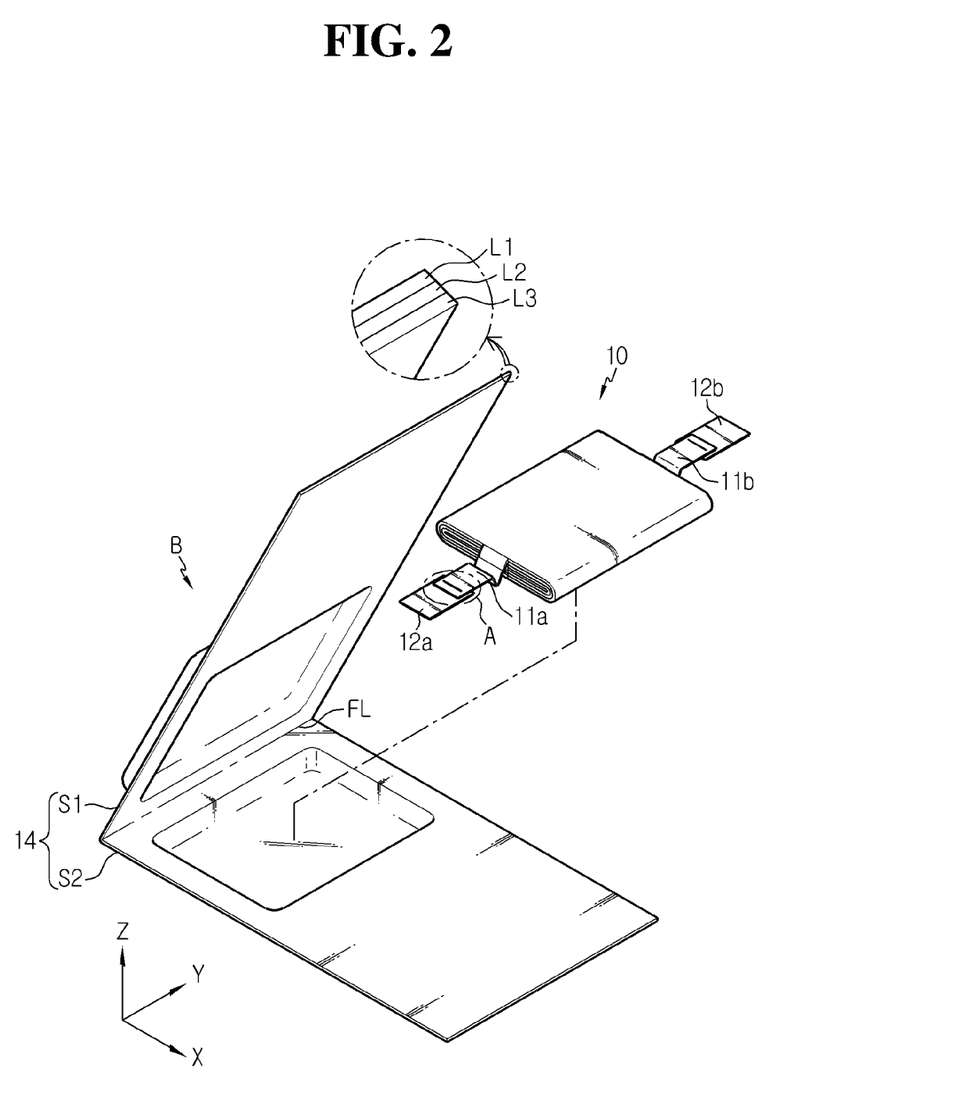
FIG. 2 is a diagram schematically showing a battery according to an embodiment of the present disclosure.

FIG. 2 is a diagram schematically showing a battery according to an embodiment of the present disclosure.

Referring to FIG. 2, a battery B is a rechargeable electrochemical device and basically includes an electrode assembly 10, a pouch case 14, and an electrolyte. The pouch case 14 provides a space capable of accommodating the electrode assembly 10, and the pouch case 14 is sealed in a state where the electrode assembly 10 is at least partly impregnated in the electrolyte injected into the corresponding space, thereby completely fabricating the battery B.

Specifically, the pouch case 14 may be composed of an upper sheet S1 and a lower sheet S2. As shown in the figure, the upper sheet S1 and the lower sheet S2 may be integrally fabricated and then separated from each other with respect to a folding line FL. Alternatively, different from the figure, the upper sheet S1 and the lower sheet S2 may be independently fabricated in a separate form and then joined together through a sealing process. At this time, the inner space in which the electrode assembly 10 may be accommodated together with the electrolyte may be formed at both the upper sheet S1 and the lower sheet S2, or at any one of the upper sheet S1 and the lower sheet S2.

The upper sheet S1 and the lower sheet S2 may have an outer insulation layer L1, an inner adhesion layer L3, and a metal layer L2 interposed between the outer insulation layer L1 and the inner adhesion layer L3. Accordingly, the inner adhesion layer of the upper sheet S1 and the inner adhesion layer of the lower sheet S2, which are distinct from each other through the folding line FL, may be brought into contact with each other. At least a part of the contact portion of the inner adhesion layers of the upper sheet S1 and the lower sheet S2 are physically coupled to each other by thermal fusion.

A positive electrode tab 11a and a negative electrode tab 11b are fabricated to protrude relatively from the body of the electrode assembly 10. A positive electrode lead 12a and a negative electrode lead 12b are coupled to the electrode tab by at least one coupling frame 100, explained later in detail, in a state where a part thereof is in contact with a part of the electrode tab. The electrode lead is provided to extend from the inside of the pouch case 14 to the outside of the pouch case 14.

Meanwhile, the positive electrode tab 11a and the negative electrode tab 11b may extend in opposite directions from the electrode assembly 10 as shown in FIG. 2, or may also extend in the same direction.

For convenience of explanation, it is assumed that an x-axis is a width direction of the battery B, a y-axis is a length direction of the battery B, and a z-axis is a thickness direction of the battery B.

Figure 3:
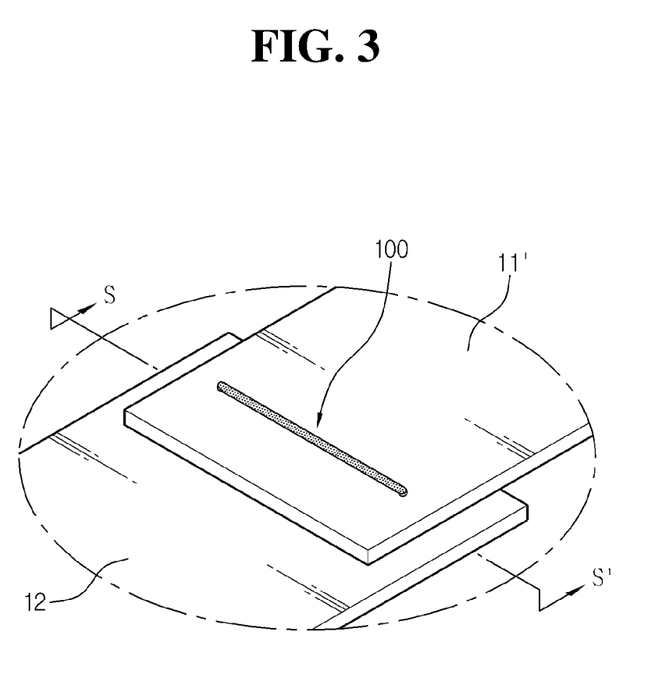
FIG. 3 is an enlarged view showing a portion A of FIG. 2.
Figure 4:
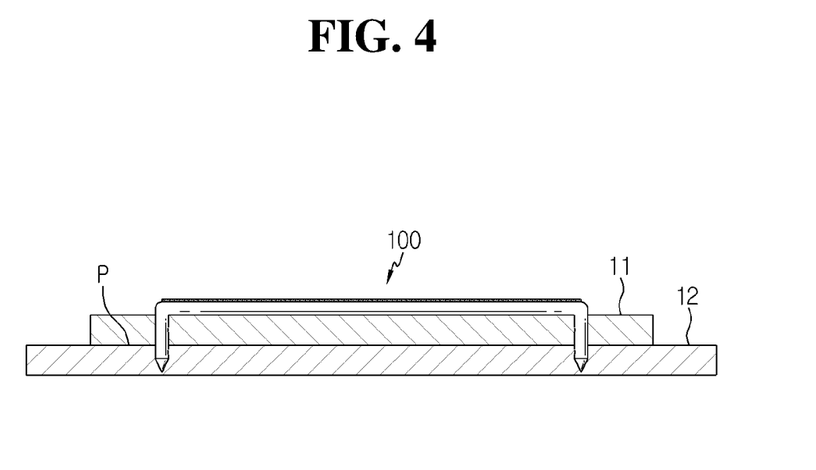
FIG. 4 is a side sectional view, taken along the line S-S' of FIG. 3.
Figure 5:
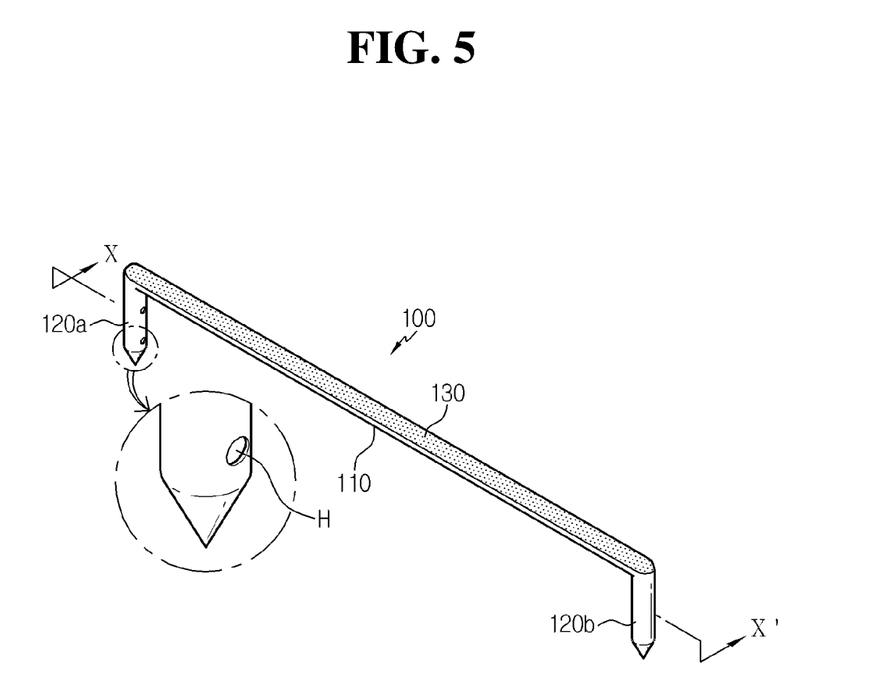
FIG. 5 is a diagram schematically showing the coupling frame of FIG. 4 according to an embodiment of the present disclosure.

FIG. 3 is an enlarged view showing a portion A of FIG. 2, FIG. 4 is a side sectional view, taken along the line S-S' of FIG. 3, and FIG. 5 is a diagram schematically showing the coupling frame 100 of FIG. 4 according to an embodiment of the present disclosure.

Referring to FIGS. 3 to 5, at least one coupling frame 100 may be provided for each joint portion between the electrode tab 11 and the electrode lead 12. For convenience of explanation, FIG. 4 depicts that one coupling frame 100 is provided at one joint portion, but it is apparent to those skilled in the art that two or more coupling frames 100 may also be provided at each joint portion and that two or more coupling frames 100 may also be provided at a plurality of joint portions.

Referring to FIGS. 4 and 5, the coupling frame 100 basically includes a support body 110 and at least one perforating portion 120, and may optionally further include a cover unit 130. When the coupling frame 100 is fabricated into a '⊂' shape or a 'U' shape by bending an integral metal material such as a wire, the support body 110 and the perforating portions 120a, 120b may be distinct from each other with reference to the bent point. Hereinafter, solely for convenience of explanation, embodiments of the present disclosure are described with the coupling frame 100 including two perforating portions 120a, 120b.

The support body 110 has a structure extending straightly with a predetermined length. Preferably, the length of the support body 110 may correspond to 50% to 90% of the width of the joint portion between the electrode tab 11 and the electrode lead 12. At least a part of the support body is in contact with any one of the electrode tab 11 and the electrode lead 12. That is, the support body 110 may be in contact with only the electrode lead 12 as shown in FIG. 3, or alternatively, a part of the support body 110 may be in contact with the electrode tab 11 and the other part may be in contact with the electrode lead 12.

The perforating portion 120a is a portion bent from one end of the support body 110 and may preferably form a first angle with the support body 110 and have a needle-type tip.

The perforating portion 120b is a portion bent from the other end of the support body 110 and may preferably form a second angle with the support body 110 and have a needle-type tip, similar to the perforating portion 120a.

For example, the first angle and the second angle may be identical or different. The first and second angles may be set to predetermined angles (e.g., right angles), and the perforating portion 120a and the perforating portion 120b may extend to be parallel to each other with the support body 110 being interposed therebetween.

As shown in the figures, a contact surface P is formed as the electrode tab 11 and the electrode lead 12 are partially overlapped, and here, each of the perforating portion 120a and the perforating portion 120b is configured to penetrate two different points of the contact surface P. That is, the perforating portion 120a completely penetrates any one of the electrode tab 11 and the electrode tab 12 (for example, the electrode tab) in a vertical direction and also penetrates or is partially inserted into the other of the electrode tab 11 and the electrode tab 12 (for example, the electrode lead) through a first point of the contact surface P. Similarly, the perforating portion 120b completely penetrates any one of the electrode tab 11 and the electrode lead 12 in a vertical direction and also penetrates or is partially inserted into the other one through a second point of the contact surface P.

FIGS. 3 to 5 show that two perforating portions 120a, 120b completely perforate the electrode tab 11 and are partially inserted into the electrode lead 12, but it may also be applied reversely. As described above, if the perforating portion 120a and the perforating portion 120b have the needle-type tip, the penetration thereof may be facilitated.

The cover unit 130, which may optionally be included in the coupling frame 100, is configured to at least partially cover the support body 110. Preferably, the cover unit 130 includes an insulating material to prevent the support body 110 from electrically contacting the electrode assembly 10 or the pouch case 14 and may be applied or bonded to a portion not contacting the electrode tab 11 or the electrode lead 12.

Figure 6:
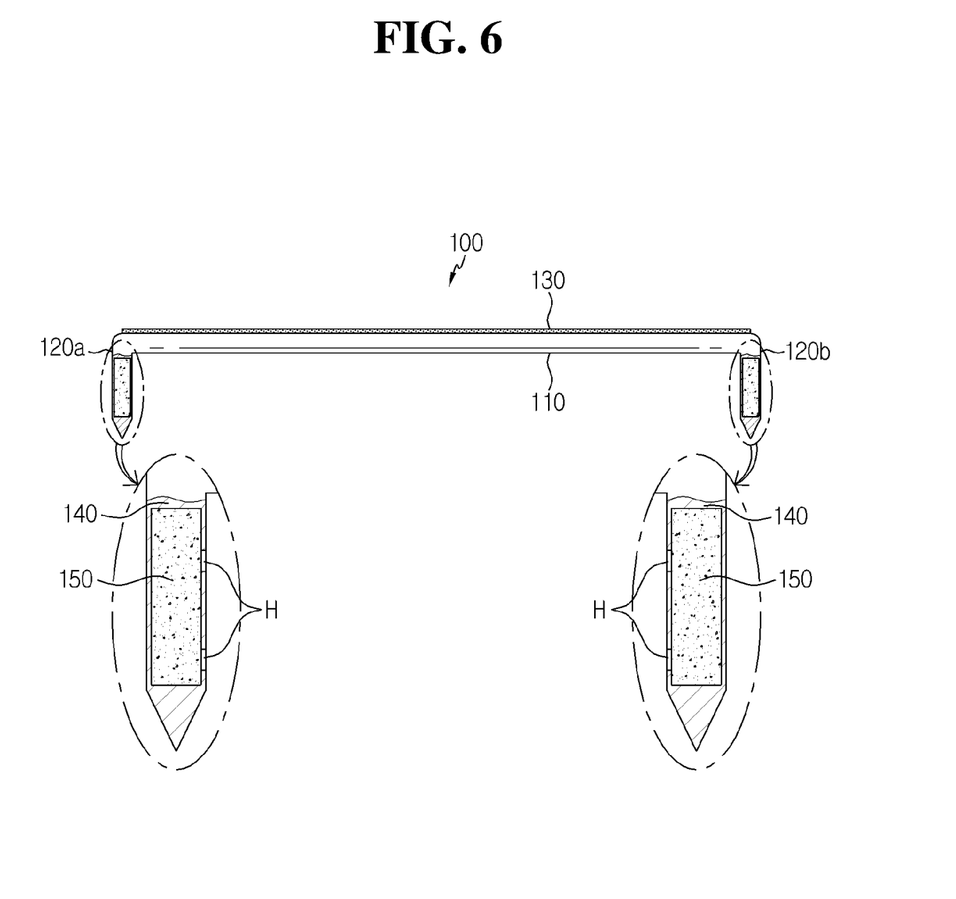
FIG. 6 is a side sectional view, taken along the line X-X' of FIG. 5.

FIG. 6 is a side sectional view, taken along the line X-X' of FIG. 5. Referring to FIG. 6, each of the perforating portions 120a, 120b may further include a pipe part 140. Optionally, each of the perforating portions 120a, 120b may further include a filler 150.

The pipe part 140 is a tube-shaped structure having an inner space and defines the appearance of the perforating portion 120. Specifically, the pipe part 140 is connected to the support body 110 and has at least one hole H formed therein. Each hole H is connected to the inner space.

The filler 150 is accommodated in the inner space of the pipe part 140 and has fluidity over a certain level in a state where a predetermined condition is satisfied.

In detail, the pipe part 140 includes a material (for example, a metal material) with thermal conductivity and electric conductivity over a certain level, and the filler 150 includes at least one kind of material allowing thermal deformation or molding, such as a thermosetting material and/or a thermoplastic material.

Optionally, the filler 150 may further include an adhesive material. If heat is applied from the support body 110 or directly to the pipe part 140, the applied heat is transferred from the pipe part 140 to the filler 150. The filler 150 may transition to a fluidal state by the heat transferred from the pipe part 140 so that at least a part of the filler 150 may be leaked out of the pipe part 140 through the hole H of the pipe part 140. At this time, the starting temperature at which the filler 150 has fluidity over a certain level by heat may be determined in advance through a preliminary experiment or the like depending on the specification and/or use environment of the battery B. For example, the filler 150 may be prepared to have fluidity only at temperature higher than the highest temperature which the battery B is capable of enduring, as known through experiments.

If the heat applied to the pipe part 140 is blocked in a state where the filler 150 is partially leaked from the inner space of the pipe part 140 due to fluidity, the filler 150 is cured reversibly or irreversibly.

Figure 7:
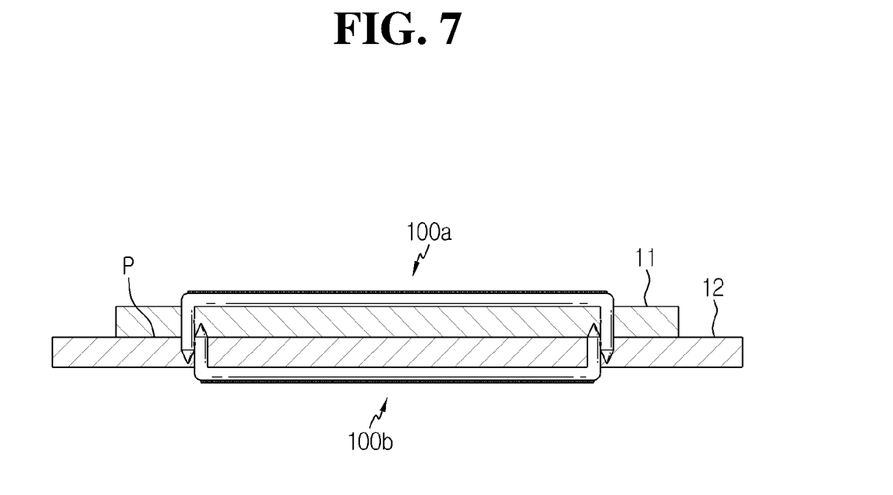
FIG. 7 is a diagram schematically showing a coupling structure between an electrode tab and an electrode lead according to another embodiment of the present disclosure.

FIG. 7 is a diagram schematically showing a coupling structure between an electrode tab 11 and an electrode lead 12 according to another embodiment of the present disclosure.

Referring to FIG. 7, in contrast to FIG. 4, it may be found that the electrode tab 11 and electrode lead 12 are mechanically coupled by two coupling frames 100a, 100b. At least one of the two coupling frames 100a, 100b may have the structure described above with reference to FIGS. 5 and 6.

In detail, the support body 110 of any one 100a of the two coupling frames 100a, 100b is in contact with the electrode tab 11 and the other support body 110 is in contact with the electrode lead 12. Specifically, in FIG. 7, each perforating portion 120 of the coupling frame 100a is inserted from the upper side to the lower side, and each perforating portion 120 of the coupling frame 100b is inserted from the lower side to the upper side.

Though not shown in the figures, when three or more coupling frames are used to mechanically couple the electrode tab 11 and the electrode lead 12, at least one of the three or more coupling frames may perforate a contact surface between the electrode tab 11 and the electrode lead 12 from the upper side to the lower side, and the remaining coupling frame may perforate from the lower side to the upper side.

Figure 8:
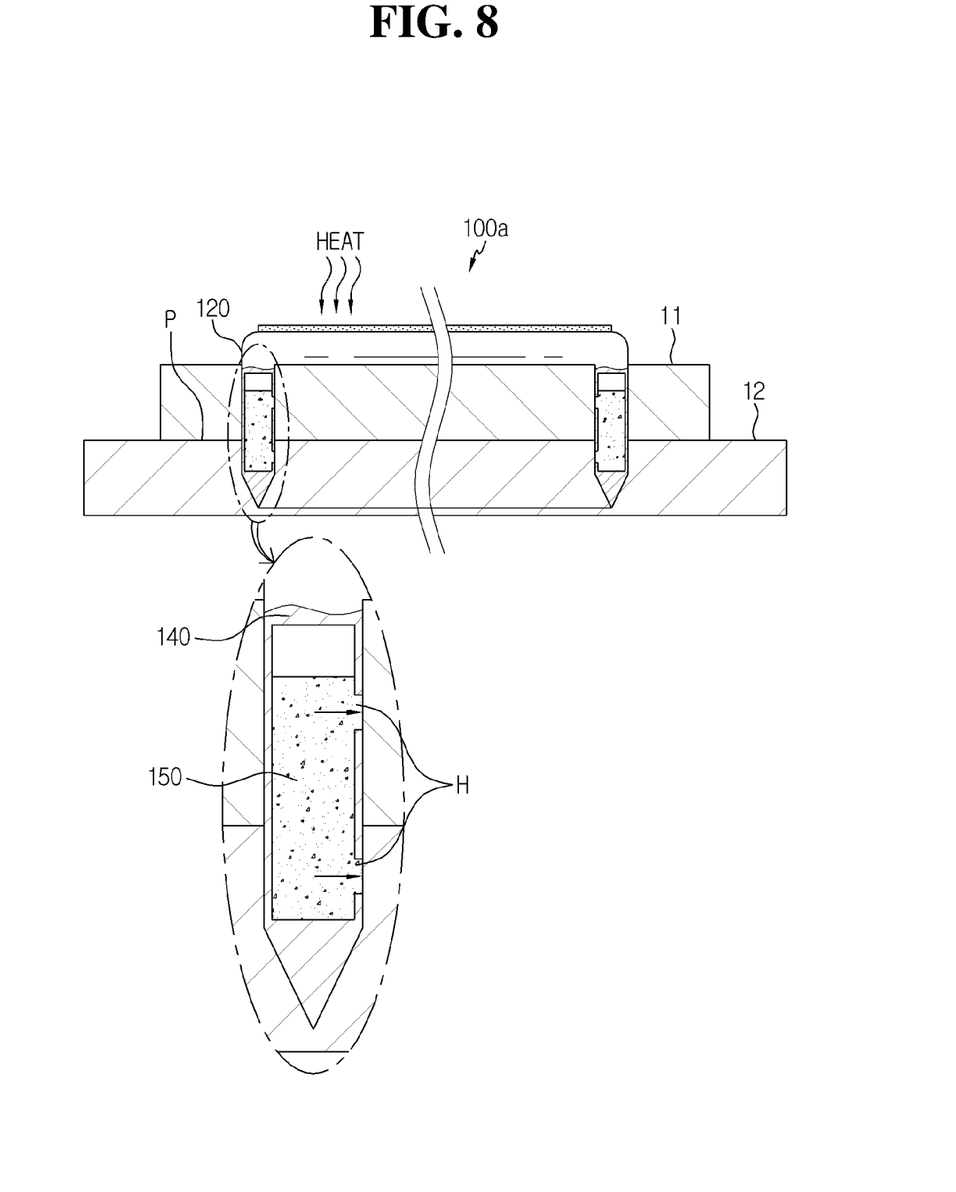
FIG. 8 is a diagram showing that the electrode tab and the electrode lead are mechanically coupled by a single coupling frame according to another embodiment of the present disclosure.

FIG. 8 is a diagram showing that the electrode tab 11 and the electrode lead 12 are mechanically coupled by a single coupling frame 100 according to another embodiment of the present disclosure. For convenience of explanation, it is assumed that the perforating portion 120 of the coupling frame 100 is configured as shown in FIG. 6.

Referring to FIG. 8, in a state where the perforating portion 120 of the coupling frame 100 is completely inserted into the electrode tab 11 and the electrode lead 12, if heat is applied to the pipe part 140, the filler 150 in the pipe part 140 has fluidity. Thus, as indicated by arrows in the inner space, a part of the filler 150 gives a pressure in contact with the inner surface of the electrode tab 11 and/or the electrode lead 12 by the fluidity of the filler 150 toward the hole H.

As described above, the filler 150 may include an adhesive material. In this case, if the heat transfer from the pipe part 140 is stopped, the filler 150 is cured in a state of pressing the inner surface of the electrode tab 11 and/or the electrode lead 12. As a result, the coupling force between the electrode tab 11 and the electrode lead 12 may be increased as compared with the case where the perforating portion 120 simply has a column shape as shown in FIG. 4.

Figure 9:
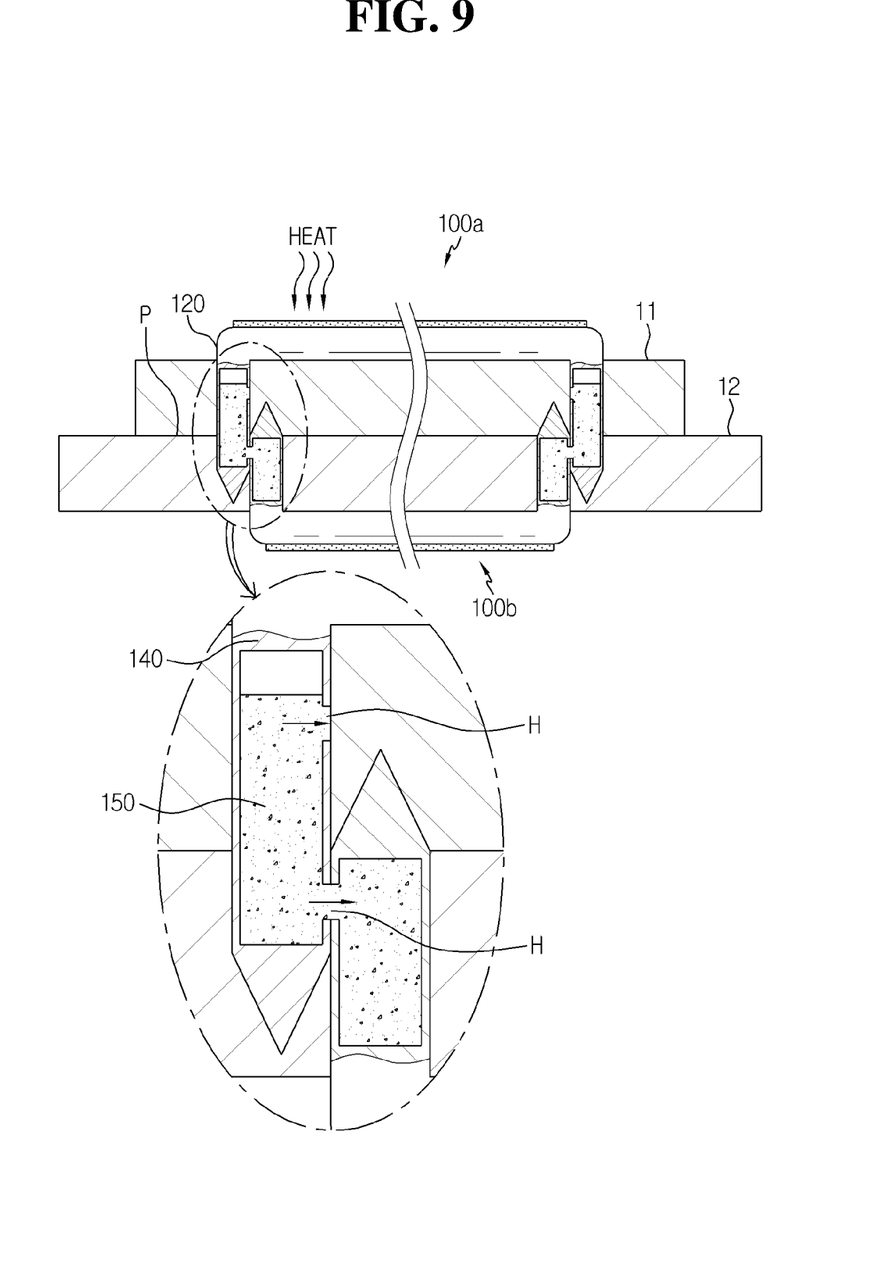
FIG. 9 is a diagram showing that the electrode tab and the electrode lead are mechanically coupled by two coupling frames according to another embodiment of the present disclosure.

FIG. 9 is a diagram showing that the electrode tab 11 and the electrode lead 12 are mechanically coupled by two coupling frames according to another embodiment of the present disclosure. For convenience of explanation, without intending to limit the scope of the invention, two coupling frames 100a, 100b are inserted in opposite directions, similar to the configuration shown in FIG. 7. Also, for convenience of explanation, without intending to limit the scope of the invention, each of two coupling frames 100a, 100b has the pipe part 140, and the filler 150 is included only in the pipe part 140 of the coupling frame 100a.

Referring to FIG. 9, in a state where all the perforating portions 120 of the two coupling frames 100a, 100b are completely inserted into the electrode tab 11 and the electrode lead 12, the hole H formed in the perforating portion 120 of the coupling frame 100a faces the hole H formed in the perforating portion 120 of the coupling frame 100b at least partially. For example, as shown in the figure, in a state where the coupling portion of the coupling frame 100a is in contact with the coupling portion of the coupling frame 100b, at least some holes of the coupling frame 100a may be positioned to face at least some holes of the coupling frame 100b formed at the corresponding positions.

If heat is applied to the pipe part 140 of the coupling frame 100a, the filler 150 in the inner space thereof is partially introduced into the inner space of the coupling frame 100b through two holes H facing each other (see arrows marked in the inner space). That is, the filler 150 filled in the inner space of the pipe part 140 included in the coupling frame 100a fills the inner space of the pipe part of the coupling frame 100b.

In this state, if the heat transfer from the pipe part 140 to the filler 150 is stopped, the filler 150 is hardened into a continuous shape from the inner space of any one of the two coupling frames 100a, 100b to the inner space of the other thereof. Accordingly, the two coupling frames 100a, 100b are formed as if they are integrated. Thus, the coupling force between the electrode tab 11 and the electrode lead 12 may be increased, compared to the structure in which two coupling frames 100 are inserted in opposite directions as shown in FIG. 7.

While the present disclosure has been described by way of embodiments and drawings, the present disclosure is not limited thereto but may be changed and modified in various ways by those skilled in the art within the equivalent scope of the appended claims.

In addition, since the present disclosure described above may be replaced, modified and changed in various ways without departing from the technical idea of the present disclosure by those skilled in the art, the present disclosure is not limited to the above embodiments or the accompanying drawings, but all or some of the embodiments may be selectively combined to make various modifications.

What is claimed is:

1. A coupling frame for coupling an electrode tab and an electrode lead of a battery, the coupling frame comprising:
   a support body extending with a predetermined length and configured to contact one of the electrode tab or the electrode lead;
   a first perforating portion bent from one end of the support body at a first angle relative to the support body, the first perforating portion having a tip; and
   a second perforating portion bent from the other end of the support body at a second angle relative to the support body, the second perforating portion having a tip,
   wherein the first perforating portion is inserted into the electrode tab and the electrode lead to pass through a first point of a contact surface between the electrode tab and the electrode lead, and
   wherein the second perforating portion is inserted into the electrode tab and the electrode lead to pass through a second point of the contact surface between the electrode tab and the electrode lead,
wherein the first and second perforating portions are sized such that when the support body contacts one of the electrode tab and the electrode lead, the tips of the first and second perforating portions are disposed within the other one of the electrode tab and the electrode lead.

2. The coupling frame according to claim 1, further comprising:
a cover unit having an insulating material and formed to cover the support body at least partially.

3. The coupling frame according to claim 1, wherein the first angle and the second angle are right angles, and the first perforating portion and the second perforating portion are parallel to each other.

4. The coupling frame according to claim 1, wherein at least one of the first perforating portion and the second perforating portion includes:
a pipe part connected to the support body and having an inner space, so that at least one hole connected to the inner space is formed therein; and
a filler accommodated in the inner space and having fluidity when a predetermined temperature has been reached.

5. The coupling frame according to claim 4, wherein the pipe part includes a material with thermal conductivity and electric conductivity, and wherein the filler includes a thermosetting material.

6. A battery, comprising:
an electrode assembly;
an electrode tab extending from one side of the electrode assembly;
an electrode lead connected to the electrode tab; and
a first coupling frame configured to couple the electrode tab and the electrode lead to each other,
wherein the first coupling frame includes:
a first support body extending with a predetermined length and configured to contact one of the electrode tab and the electrode lead;
a first perforating portion bent from one end of the first support body at a first angle relative to the first support body, the first perforating portion having a tip; and
a second perforating portion bent from the other end of the first support body at a second angle relative to the first support body, the second perforating portion having a tip,
wherein the first perforating portion is inserted from the electrode tab toward the electrode lead to pass through a first point of a contact surface between the electrode tab and the electrode lead, and
wherein the second perforating portion is inserted from the electrode tab toward the electrode lead to pass through a second point of the contact surface between the electrode tab and the electrode lead
wherein the first and second perforating portions are sized such that when the first support body contacts one of the electrode tab and the electrode lead, the tips of the first and second perforating portions are disposed within the other one of the electrode tab and the electrode lead.

7. The battery according to claim 6, further comprising a second coupling frame that includes:
a second support body extending with a predetermined length and configured to contact the other one of the electrode tab and the electrode lead;
a third perforating portion bent from one end of the second support body at a first angle relative to the second support body, the third perforating portion having a tip; and
a fourth perforating portion bent from the other end of the second support body at a second angle relative to the second support body, the fourth perforating portion having a tip,
wherein the third perforating portion is inserted from the electrode lead toward the electrode tab to pass through a third point of the contact surface between the electrode tab and the electrode lead, and
wherein the fourth perforating portion is inserted from the electrode lead toward the electrode tab to pass through a fourth point of the contact surface between the electrode tab and the electrode lead.

8. The battery according to claim 7, wherein the first perforating portion and the third perforating portion at least partially come into contact with each other in a state of being inserted into the electrode tab and the electrode lead, respectively.

9. The battery according to claim 8, wherein the first perforating portion includes:
a first pipe part connected to the first support body and having a first inner space, so that a first hole connected to the first inner space is formed therein; and
a filler accommodated in the first inner space and having fluidity when a predetermined temperature has been reached.

10. The battery according to claim 9, wherein the third perforating portion includes:
a third pipe part connected to the second support body and having a second inner space, so that a second hole connected to the second inner space is formed therein,
wherein the first hole and the second hole at least partially face each other in a state where the first coupling frame and the second coupling frame are inserted into the electrode tab and the electrode lead, respectively.

11. The battery according to claim 10, wherein the filler is leaked from the first hole due to heat transferred from the first pipe part and introduced into the second inner space through the second hole.

12. The battery according to claim 4,
wherein the pipe part has a first end connected to the support body and a second end, the at least one hole being disposed between the first and second ends of the pipe part.

* * * * *